United States Patent [19]

Joachim et al.

[11] Patent Number: 5,869,142
[45] Date of Patent: Feb. 9, 1999

[54] METHOD FOR IMPROVING THE MECHANICAL PROPERTIES OF A GLASS-FIBER MAT

[75] Inventors: Jacky Joachim, Gouvieux; Bernard Lericque, Rantigny, both of France

[73] Assignee: Isover Saint-Gobain, France

[21] Appl. No.: 737,283

[22] PCT Filed: Feb. 27, 1996

[86] PCT No.: PCT/EP96/00788

§ 371 Date: Nov. 6, 1996

§ 102(e) Date: Nov. 6, 1996

[87] PCT Pub. No.: WO96/27562

PCT Pub. Date: Sep. 12, 1996

[30] Foreign Application Priority Data

Mar. 6, 1995 [DE] Germany ............... 195 07 787.3

[51] Int. Cl.⁶ ................ B05D 1/02; B05D 1/34; B05D 1/36; B05D 3/02

[52] U.S. Cl. .............. 427/333; 427/340; 427/314; 427/407.3; 427/426

[58] Field of Search ............... 427/407.2, 407.3, 427/333, 340, 341, 426

[56] References Cited

U.S. PATENT DOCUMENTS

| | | | |
|---|---|---|---|
| 4,176,105 | 11/1979 | Miedaner | 260/29.3 |
| 4,255,485 | 3/1981 | Yau | 428/288 |
| 4,663,419 | 5/1987 | Fugier et al. | 528/164 |

FOREIGN PATENT DOCUMENTS 1144192  3/1969  United Kingdom .

*Primary Examiner*—Erma Cameron
*Attorney, Agent, or Firm*—Fulbright & Jaworski L.L.P.

[57] ABSTRACT

To improve the reduction in tensile strength due to aging as well as the recovery, a weak acid is applied to a glass fiber mat containing a phenolic condensation resin binder before the binder is hardened.

14 Claims, No Drawings

METHOD FOR IMPROVING THE MECHANICAL PROPERTIES OF A GLASS-FIBER MAT

BACKGROUND OF THE INVENTION

1. Field of the Invention

The invention relates to a method for improving the mechanical properties of a glass-fiber mat obtained by applying a binder containing an aqueous phenolic condensation resin to the mat and hardening the binder.

2. Discussion of the Related Technology

Glass-fiber mats are used mainly as thermal insulating material. The binder is supposed to bind the fibers firmly together to obtain a coherent structure. The binder is at the same time supposed to ensure sufficient elasticity of the insulating material and high recovery thereof after compression so that the insulating material can be stored, transported and deformed for use at the final location.

U.S. Pat. No. 4,663,419 discloses using for a glass-fiber mat a binder containing a condensation product from phenol, formaldehyde and urea condensed in the presence of a basic catalyst, and additional urea and further additives, namely silane, mineral oil, ammonia and ammonium sulfate. The binder is sprayed as an aqueous solution on the raw mat that is then pressed and put in the desired form for the insulating material, for example a panel or a pipe, after which it is fed to a curing oven where the binder is hardened.

U.S. Pat No. 4,176,105 discloses a binder for a glass-fiber mat which is obtained by reaction of a phenol-formaldehyde-urea condensation resin with boric acid and urea. Per 100 parts by weight of phenol-formaldehyde-urea condensation resin 12 to 16 parts by weight of boric acid are added. When the resin hardens a boric acid complex is formed. This is intended to increase the resistance of the binder to punking at high temperatures.

However, known binders leave something to be desired with respect to the mechanical strength of the glass-fiber mat, in particular the tensile strength and the recovery after compression of the mat, especially after it has been stored for some time.

SUMMARY OF THE INVENTION

The invention is therefore based on the problem of improving the mechanical properties of a glass-fiber mat.

This is obtained according to the invention by adding a weak acid with a pK value of more than 4, in particular more than 5, to the glass-fiber mat before hardening the binder.

The pK value is defined as the negative decadic logarithm of the acid dissociation constant at 25° C.

DETAILED DESCRIPTION OF THE INVENTION

The weak acid is preferably added in an amount of 0.5 to 10 percent by weight, in particular 1 to 5 percent by weight, based on the solids content of the phenolic condensation resin of the binder. When the acid is added in an amount of less than 0.5 percent by weight no improvement of the mechanical properties is observed. On the other hand, no further improvement occurs, but actually a reduction of the mechanical properties, when the amount of weak acid exceeds 10 percent by weight.

The amount of binder, including the additives and the weak acid, after hardening is 3 to 7, preferably 4 to 6, percent by weight based on the total weight of the mat. The amount of weak acid after hardening of the binder is 0.05 to 1, preferably 0.08 to 0.6, percent by weight based on the total weight of the mat.

Suitable weak acids are in particular boric acid and carboxylic acids with a pK value of more than 4, in particular more than 5.

The carboxylic acid can be a monobasic or polybasic carboxylic acid with or without hydroxyl groups, for example citric acid or a fatty acid. Fatty acids with more than 8 carbon atoms, such as lauric, palmitic, stearic or oleic acid, have proven particularly suitable, in particular fatty acids with one or more C=C double bonds such as oleic acid.

The phenolic condensation resin of the binder is preferably a water-soluble condensation product from phenol and formaldehyde or from phenol, formaldehyde and urea, the condensation being performed in the presence of a basic catalyst, in particular an alkaline or alkaline-earth metal hydroxide, for example sodium, potassium, calcium or barium hydroxide. The phenolic condensation resin can be produced for example according to U.S. Pat. No. 4,663,419.

In addition to the condensation resin the binder can contain urea and additives, in particular silane, mineral oil, ammonia and/or ammonium sulfate.

For example the binder can have the composition below:

55 to 70 parts by weight of water-soluble phenolic resin (based on the solids)

45 to 30 parts by weight of urea 0.1 to 0.5 parts by weight of silane 6 to 15 parts by weight of mineral oil 1 to 5 parts by weight of ammonium sulfate 2 to 10 parts by weight of ammonia (as $NH_3$).

The silane used is preferably a silane with an amine group which can be reacted with the phenol groups of the condensation resin.

Of the 6 to 15 parts by weight of mineral oil, however, only 0.4 to 1.2 parts by weight generally remain in the finished mat. The ammonia is added as an aqueous, for example about 20%, solution.

The mat is produced continuously, the spun glass fibers being deposited as a mat statistically distributed in all directions on a transport band. While the fibers fall onto the transport band they are sprayed with the liquid binder. Then the mat is fed to a curing oven to harden the binder.

The weak acid can be added to the liquid binder and thus sprayed onto the glass fibers falling onto the transport band in a mixture with the binder. However it is also possible to spray the binder and the weak acid onto the falling glass fibers separately, i.e. to provide separate spray nozzles for the liquid binder, on the one hand, and a solution of the weak acid, on the other hand. The weak acid is applied separately in particular when an incompatibility exists between the weak acid and the components of the binder, e.g. with fatty acids with more than 8 carbon atoms.

The inventive method improves in particular the tensile strength and the recovery of the mat after compression, especially when the mat has been stored for some time.

As has turned out, the inventive method improves in particular the tensile strength and the recovery of mats comprising glass fibers having an alkali oxide content of 8 to 25 molar percent, in particular glass fibers having a high sodium oxide content of more than 16 molar percent, for example glass fibers containing 16.5 to 19 molar percent sodium oxide, 0.2 to 0.5 molar percent potassium oxide and 8 to 18 molar percent boron oxide. Mats made of these glass fibers show particularly strong reduction of their mechanical properties when they age, i.e. in particular after a long storage period, especially with respect to recovery.

The following examples will serve to explain the invention further. The examples use glass fibers with the composition stated in Table I below.

TABLE I

| Components | A Mol. % | B Mol. % |
|---|---|---|
| $SiO_2$ | 57.5 | 56.5 |
| $Fe_2O_3$ | 0.3 | |
| $Al_2O_3$ | 0.5 | 1 |
| CaO | 8 | 8 |
| MgO | 3.5 | 3.5 |
| $Na_2O$ | 17.7 | 17.5 |
| $K_2O$ | 0.26 | 0.3 |
| $B_2O_3$ | 12 | 13 |

To determine tensile strength, aging of tensile strength and recovery of the compressed mat one performs the following tests.

a) Determination of tensile strength and aging of tensile strength

Two equal-sized doughnut-shaped samples are cut out of the particular mat and their weight determined. The first doughnut-shaped sample is torn apart and the tearing force in gram force per gram (gf/g) of mat indicates the tensile strength (RT original). The second doughnut-shaped sample is put in an autoclave with a temperature of 105° C. and a humidity of 100 percent for 15 minutes. The tensile strength (RT autoclave) in gf/g is then determined.

b) Determination of recovery versus storage time

A sample is cut out of the mat and its thickness determined. The sample is compressed to one sixth of this thickness with a press. The compressed state is maintained for one hour, 24 hours, 12 days and one month. For each period the press is then opened and the increase in thickness of the relieved mat is measured. The compressed mats are stored at room temperature.

Recovery (RE) is determined as follows.

$$\% \text{ Recovery} = \frac{\text{Measured thickness}}{\text{Nominal thickness}} \times 100$$

To determine the aging of recovery one repeats the above test, except that the mat is kept in the compressed state in a humid room at 35° C. and an air humidity of 95% for one day. A retained compressed sample is stored at room temperature for the same period of time. The compression for both samples is then released and the increase in thickness of the relieved mat is measured after 7 days.

Recovery after accelerated aging (RE aging) is determined by the loss of thickness between the retained sample and the aged sample.

EXAMPLE 1

A binder with the following composition is produced:

55 parts by weight of phenol-formaldehyde condensation resin (weight based on solids)

45 parts by weight of urea 9.5 parts by weight of mineral oil 0.3 parts by weight of silane 20 parts by weight of ammonium hydroxide (as 20% solution)

3 parts by weight of boric acid

The binder diluted with water is sprayed onto A glass fibers falling onto a transport band. The mat mixed with binder formed on the transport band is then hardened in a curing oven. The amount of sprayed-on binder is 5.0% by weight (after hardening) based on the weight of the glass fibers. The amount of boric acid is 0.171% by weight based on the weight of the glass fibers.

Comparative example 1

Example 1 is repeated except that a binder with the following composition is sprayed onto the glass fibers:

55 parts by weight of phenol-formaldehyde condensation resin (weight based on solids)

45 parts by weight of urea 9.5 parts by weight of mineral oil 0.3 parts by weight of silane 3 parts by weight of ammonium sulfate 6 parts by weight of ammonium hydroxide (as circa 20% solution)

EXAMPLE 2

Example 1 is repeated except that the boric acid is sprayed on separately from the binder.

EXAMPLE 3

Example 1 is repeated except that B glass fibers are used instead of A glass fibers.

Tests a), b) were performed with the obtained mats. The results are summarized in Table II below.

TABLE II

| | cf. Ex. 1 | Ex. 1 | Ex. 2 | Ex. 3 |
|---|---|---|---|---|
| a) Tensile strength | | | | |
| RT original gf/g | 250 | 250 | 229 | 219 |
| RT autoclave gf/g | 144 | 193 | 174 | 164 |
| Loss | 42 | 23 | 24 | 25 |
| b) Recovery RE | | | | |
| RE | | | | |
| 1 h | 145 | 147 | — | 143 |
| 24 h | 139 | 140 | — | 138 |
| 12 days | 128 | 132 | — | 128 |
| 1 month | 129 | 126 | — | 126 |
| RE aging | 39 | 24 | 21 | 29 |

EXAMPLES 4 and 5 AND COMPARATIVE EXAMPLE 2

Test a) for determining tensile strength was performed with two further mats produced substantially according to examples 1 and 2 and a further mat produced substantially according to comparative example 1, the test being modified in that a third doughnut-shaped sample was kept in the autoclave at 105° C. and a humidity of 100% for 45 minutes.

The results are shown in Table III below.

TABLE III

| | Cf. Ex. 2 | Ex. 4 | Ex. 5 |
|---|---|---|---|
| Tensile strength original gf/g | 225 | 249 | 234 |
| Tensile strength | 135 | 161 | 164 |

TABLE III-continued

|  | Cf. Ex. 2 | Ex. 4 | Ex. 5 |
| --- | --- | --- | --- |
| autoclave 15 min gf/g | | | |
| Tensile strength autoclave 45 min gf/g | 118 | 167 | 155 |

As Table III indicates, the tensile strength of the mat according to examples 4 and 5 clearly decreases more slowly through the artificial aging in the autoclave than the mat according to comparative example 2.

EXAMPLES 6 to 9

Example 1 was repeated, using a binder with the following composition:
55 parts by weight of phenol-formaldehyde condensation resin (weight based on solids)
45 parts by weight of urea
9.5 parts by weight of mineral oil
3 parts by weight of ammonium sulfate
0.3 parts by weight of silane
6 parts by weight of ammonium hydroxide (as circa 20% aqueous solution)

Separately from the binder the following carboxylic acids were sprayed onto the glass fibers:
citric acid (example 6),
lauric acid (example 7), and
oleic acid (example 8)

The amount of sprayed-on carboxylic acid is about 0.4 percent based on the weight of the glass fibers.

Tests a) and b) described above were performed with the mats according to examples 6 to 9. The test results are shown in Table IV below together with the corresponding test results for comparative example 1.

TABLE IV

|  | Cf. Ex. 1 | Ex. 6 | Ex. 7 | Ex. 8 |
| --- | --- | --- | --- | --- |
| a) Tensile strength | | | | |
| RT original gf/g | 250 | 270 | 276 | 255 |
| RT autoclave gf/g | 144 | 168 | 167 | 189 |
| Loss | 45 | 38 | 39 | 26 |
| b) Recovery | | | | |
| RE | | | | |
| 1 h | 145 | 148 | 148 | 148 |
| 24 h | 139 | 142 | 142 | 144 |
| 12 days | 128 | 123 | 134 | 139 |
| 1 month | 129 | 127 | 127 | 134 |
| RE aging | 39 | 37 | 34 | 27 |

We claim:

1. A method for improving the tensile strength and the age-related degradation of the compression-recovery of a glass fiber insulation mat consisting of glass fibers with an alkali oxide content of more than 8 molar percent, comprising the steps of:

applying an aqueous binder containing a phenolic condensation resin to the mat;

applying a weak acid with a pKa value of more than 4.0 to the mat in the amount of 0.01% to 3.0% by weight based on the weight of the glass fibers in the mat; and hardening the binder;

wherein the binder, including the weak acid, is applied in an amount of up to 7% by weight, after hardening, of the total weight of the mat.

2. The method according to claim 1, wherein the weak acid is boric acid or a carboxylic acid.

3. The method according to claim 2, wherein the weak acid is a carboxylic acid.

4. The method of claim 3, wherein the carboxylic acid is a fatty acid with more than eight carbon atoms.

5. The method of claim 3, wherein the carboxylic acid is an unsaturated carboxylic acid.

6. The method according to claim 1, wherein the phenolic condensation resin is selected from the group consisting of:

the reaction product of phenol and formaldehyde in the presence of a basic catalyst, and the reaction product of phenol, formaldehyde and urea in the presence of a basic catalyst.

7. The method according to claim 1, wherein the binder further comprises one or more of the following: urea, a silane, mineral oil, ammonia and ammonium sulfate.

8. The method of claim 7, wherein the silane has an amine group.

9. A method according to claim 1, wherein the binder is applied to the mat by spraying.

10. A method according to claim 1, wherein the weak acid is applied by spraying.

11. The method of claim 9, wherein the weak acid is sprayed on in a mixture with the binder.

12. A method according to claim 1, 9 or 10, wherein the steps of applying a binder and applying a weak acid are performed separately.

13. The method according to claim 1, wherein the mat contains glass fibers having an alkali oxide content of 8 to 25 molar percent.

14. The method of claim 7, wherein the glass fibers contain 16.5 to 19 molar percent sodium oxide, 0.2 to 0.5 molar percent potassium oxidde and 8 to 18 molar percent boron oxide.

* * * * *